United States Patent [19]

Björnberg et al.

[11] Patent Number: 4,605,544
[45] Date of Patent: Aug. 12, 1986

[54] METHOD FOR PRODUCING SELENIUM SALTS

[75] Inventors: Arne Björnberg, Skelleftehamn; Ulf S. Martensson, Skellefteå; Karin M. Paulsson, Skelleftehamn, all of Sweden

[73] Assignee: Boliden Aktiebolag, Stockholm, Sweden

[21] Appl. No.: 644,728
[22] PCT Filed: Nov. 15, 1983
[86] PCT No.: PCT/SE83/00400
§ 371 Date: Aug. 22, 1984
§ 102(e) Date: Aug. 22, 1984
[87] PCT Pub. No.: WO84/02513
PCT Pub. Date: Jul. 5, 1984

[30] Foreign Application Priority Data

Dec. 22, 1982 [SE] Sweden ............................. 8207344

[51] Int. Cl.[4] .......................................... C01B 19/00
[52] U.S. Cl. ................................................... 423/508
[58] Field of Search ....................................... 423/508

[56] References Cited
FOREIGN PATENT DOCUMENTS 20826 1/1981 European Pat. Off. .
1667764 7/1971 Fed. Rep. of Germany .
808637 2/1959 United Kingdom .
139307 of 0000 U.S.S.R. ............................. 423/508

OTHER PUBLICATIONS

*The Condensed Chemical Dictionary*, 8th edition, Van Nostrand Reinhold Company, New York, 1960.
Gremlin Handbook of Inorganic Chemistry, 8th Edition, 1981, pp. 227 and 297.

*Primary Examiner*—John Doll
*Assistant Examiner*—Jackson Leeds
*Attorney, Agent, or Firm*—Burns, Doane, Swecker & Mathis

[57] ABSTRACT

Method for producing alkali metal selenite and alkali metal selenate from metallic selenium through selenous acid. The selenium is dissolved in nitric acid to form silenous acid, which is reacted with an alkali metal base to from alkali metal selenite. The formed selenite is then spray dried. Alternatively, the formed selenite is oxidized at elevated temperature in a basic environment at pH 10-12, with hydrogen peroxide as the oxidant, to form selenate, which is then spray dried. The invention also relates to products produced by the method. The products are intended to be incorporated in animal fodder or foodstuffs (solenite), or in fertilizers (selenate), to be thus administered to human beings and animals as trace substances.

7 Claims, 1 Drawing Figure

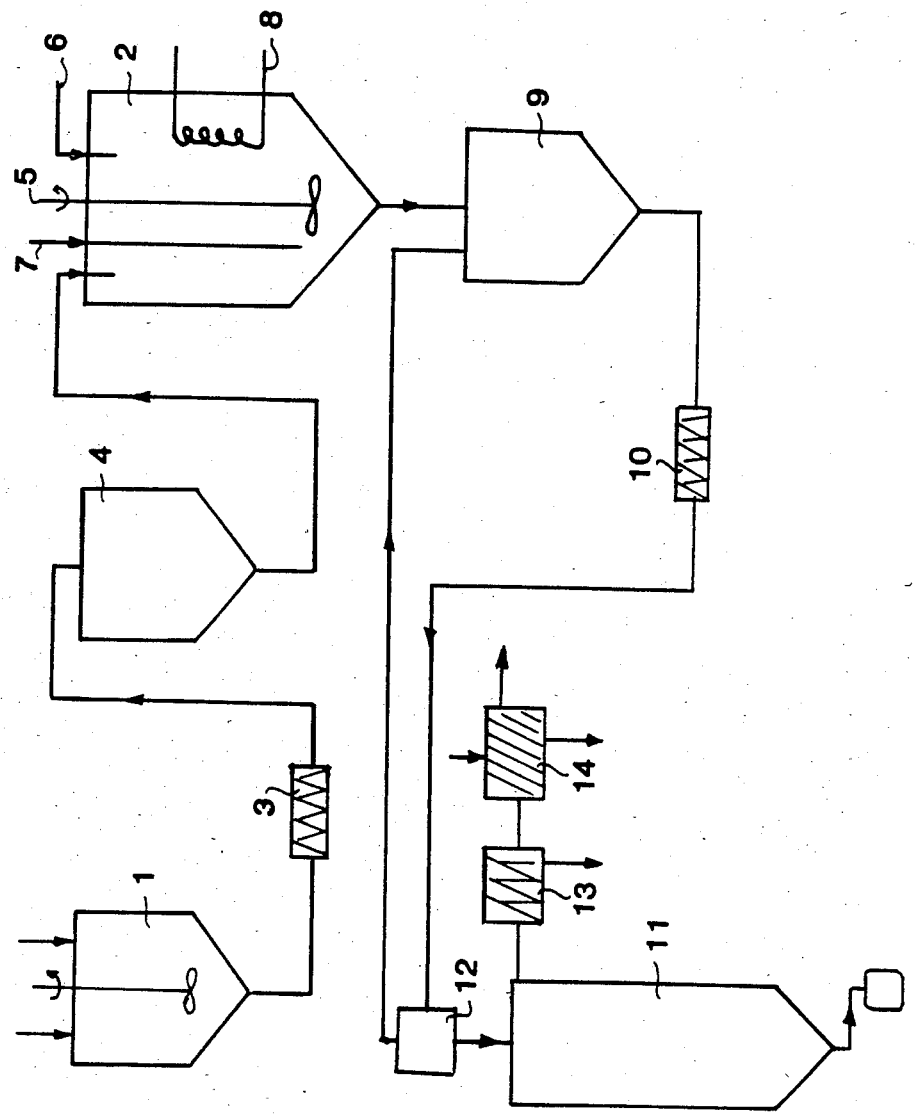

METHOD FOR PRODUCING SELENIUM SALTS

DESCRIPTION

1. Technical Field

The present invention relates to a method for preparing selenium salts, particularly alkali metal selenate, from metallic selenium; and to the products produced.

The object of the invention is to provide a possibility of rationally producing alkali metal selenate, these salts being essential salts for the administration of selenium to human beings and animals as trace elements.

2. Background Art

It is known to administer sodium selenite, $Na_2SeO_3$, as a trace substance to human beings and to animals, selenium constituting an important trace substance for both human beings and animals. In this respect, selenite is administered either indirectly, in animal fodder or in foodstuffs, or directly, in the form of a spray which is administered orally.

It is known that in the case of human beings, such illnesses as multiple sclerosis (MS), cardiovascular illnesses, and certain forms of cancer can be related to a selenium deficiency. It is also known that selenium deficiency in animals can lead to, among other things, muscular dystrophy and reduced fertility.

It is also known that selenium can be administered through plants which are eaten by animals, the selenium being incorporated in the fertilizers used, in plant top-dressing substances, or in the seed. When concerning the amount of selenium absorbed by plants, selenate is more effect than selenite. Consequently, the administration of selenium through the fertilizers used constitutes a simple and rational method, especially in the case of large herds of grazing animals, when compared with administering selenium orally in the form of selenite.

The large herds of animals which roam and graze free in many countries throughout the world, have greatly increased the need of supplying selenate either through the fertilizers used or in the form of selenate prills.

It is known to produce sodium selenate electrolytically, starting from a solution of sodium selenite.

It is also known to produce selenic acid $H_2SeO_4$ by oxidizing selenious acid $H_2SeO_3$ with hydrogen peroxide. The resultant selenic acid, however, contains 2-3% selenious acid. The selenic acid can then be reacted with sodium carbonate, to form sodium selenate, although the selenate becomes contaminated with elementary selenium. When selenic acid is reacted with sodium hydroxide, the end product is contaminated with sodium selenite.

EP-A1 No. 0 020 826 describes a method for separating and recovering metals, including selenium, from anode slime by leaching, solvent extraction, precipitation and reduction, whereby the anode slime is primarily leached with nitric acid, separating the selenium with liquid-liquid to denitration and chlorination extraction, reducing the selenium by sulphur dioxide.

Gmelin Handbook of Inorganic Chemistry, supplement, vol. B 1, system nr 10, 1981, pages 227 and 297 describes the reaction of selenious acid with alkali hydroxides in aqueous solutions to form selenites; as well as the formation of the selenate ion by oxidizing $SeO_3^{2-}$ with $O_2$, $O_3$ or $H_2O_2$. However, any reaction in basic environment is not disclosed, and oxidation of $SeO_3^{2-}$ in acidic environment follows the route and drawbacks indicated above.

Consequently there is a need for a method which enables high-quality selenate to be manufactured in a simple and rational manner, especially selenate having alkali metal cations.

DESCRIPTION OF THE INVENTION

It has now surprisingly been found possible to produce selenates in a simple and rational manner by means of the present invention, which is characterized by dissolving metallic selenium in nitric acid to form selenious acid; reacting the selenious acid with an alkali metal hydroxide, alkali metal carbonate and/or some other metal oxide/hydroxide to form an alkali metal selenite; oxidizing the selenite in a basic environment with an oxidant in the form of hydrogen peroxide to form a selenate, which is then spray-dried.

Further, characterizing features of the invention are set forth in the following claims.

By means of the invention it is possible to produce an extremely finely divided selenate having a small residual selenite content (<1%) and a low residual water content.

The particulate form in which the products are obtained enables them to be used readily in fertilizers, since it is readily simple to fix the products to the surfaces of granules, using known adhesion techniques.

Both sodium selenate, and possium selenate can be produced by means of the method according to the invention.

The chemical reactions involved in the method are:

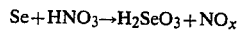

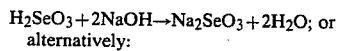

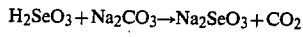

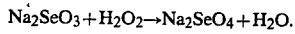

The invention will now be described with reference to the accompanying drawing, the single FIGURE of which illustrates a plant for manufacturing selenate.

EXAMPLE 1

790 grams of so-called standard selenium (99.9% Se) were dissolved in 1300 ml of warm 65%-nitric acid. The selenious acid, $H_2SeO_3$, obtained, 1290 grams, was then admixed with a stoichiometric amount of NaOH, 800 grams, as a 50%-solution of sodium hydroxide, there being obtained 1730 grams of sodium selenite and a further 360 grams of water. The pH was adjusted to 11, by adding a further minor amount of NaOH. Hydrogen peroxide (50%) was then stirred into the sodium-selenite solution in a stoichiometric excess, at a temperature of 70° C., the sodium selenite being oxidized to sodium selenate. The hydrogen peroxide was added slowly to the sodium-selenite solution. The resultant solution, which, upon completion of the oxidizing process, contained sodium selenate, was passed through a buffer tank and a filter to a spray dryer, in which the product was dried. The temperature of the ingoing drying air was 360° C., and the temperature of the outgoing air 110° C. The end product had the form of a white, solid, powderous sodium selenate, containing 98% $Na_2SeO_4$, 0.9% $Na_2SeO_3$ and a balancing amount of water, partly in chemically bound form and partly as free water. The yield was 98%.

Referring now to the accompanying drawing, the above reactions were carried out in a plant which comprised a first reaction vessel 1, in which pulvurent selenium was admixed with nitric acid. The resultant selenous acid was then transferred to a second reaction vessel 2, via a filter 3 and an intermediate buffer tank 4. The reaction vessel 2 is provided with a stirrer 5, a supply conduit 6 for 50%-NaOH, and a supply conduit 7 for 50%—$H_2O_2$. The exit orifice of the conduit 7 is located adjacent the stirrer 5. In a first reaction stage in the second reaction vessel 2, NaOH is supplied until the appropriate pH is reached, and the temperature is adjusted to 70° C., whereafter $H_2O_2$ was supplied through the conduit 7. The oxidizing reaction by which selenate is formed is exothermic, and hence the solution is cooled so as to maintain a temperature of 70° C. Cooling is effected by means of a coolant passed through a cooling coil 8. Upon completion of the oxidizing process, the reaction mixture, which suitably contains 500 grams of sodium selenate per liter of mixture, is transferred to a buffer tank 9, and from there, via a filter 10, to a spray dryer 11 provided with a hold-up tank 12. The tank 12 is held permanently full, by pumping thereto sodium-selenate solution from the buffer tank 9. The sodium-selenate solution is dried in the spray dryer 11, whereafter the resultant solid sodium selenate is removed and packed. The air water-vapour is permitted to pass through a dust filter 13 and a scrubber 14, to eliminate any accompanying solid substance, whereafter the cleansed air is released to the surroundings.

The nitric acid used should be relatively concentrated, and suitably has a concentration of 50% or higher.

Although the above reactions have been described with reference to alkali metal hydroxide, it will be understood that the reactions can be effected with another metal oxide/hydroxide if a cation other than alkali metal is desired, such as magnesium or cobalt for example.

We claim:

1. A method for producing metal selenate comprising:
    (a) dissolving metallic selenium in nitric acid to obtain selenious acid;
    (b) reacting the selenious acid with a material selected from the group consisting of alkali metal hydroxide, alkali metal carbonate, metal oxide/hydroxide or mixtures thereof to form metal selenite;
    (c) oxidizing the metal selenite with hydrogen peroxide at a temperature of from 60° to 75° C. and maintaining a pH of from 10 to 12 to form metal selenate; and
    (d) drying the metal selenate.

2. The method of claim 1 wherein the metal selenite is oxidized to metal selenate at a temperature of 70° C.

3. The method of claim 1 wherein the oxidation of the metal selenite to metal selenate is effected by means of hydrogen peroxide in a stoichiometric excess of that needed to oxidize the metal selenite to metal selenate.

4. The method of claim 2 wherein the metal selenate is dried in a spray drier.

5. The method of claim 4 wherein the drying is effected with hot air which has an outgoing temperature of 100° C.

6. The method of claim 1 wherein drying is effected with hot air which has an outgoing temperature of 110° C.

7. The method of claim 3 wherein the hydrogen peroxide used to oxidize the metal selenite is introduced to the reaction mixture beneath the surface thereof adjacent agitator means arranged in said reaction mixture.

* * * * *